United States Patent [19]
Al et al.

[11] 3,915,478
[45] Oct. 28, 1975

[54] CORROSION RESISTANT PIPE JOINT

[75] Inventors: René J. Al; Gerald B. Smith, both of Bradford, Pa.

[73] Assignee: Dresser Industries, Inc., Dallas, Tex.

[22] Filed: Dec. 11, 1974

[21] Appl. No.: 531,840

[52] U.S. Cl. .................. 285/45; 285/342; 285/354; 403/288
[51] Int. Cl.² ......................................... F16L 11/12
[58] Field of Search ....... 285/45, 52, 342, 354, 369; 85/1 C, 1 JP; 277/64; 138/145; 403/288

[56] References Cited
UNITED STATES PATENTS
3,675,950  7/1972  Beene ........................... 285/45
3,799,584  3/1974  Slocum .......................... 285/45

Primary Examiner—Andrew V. Kundrat
Attorney, Agent, or Firm—Daniel Rubin

[57] ABSTRACT

Pipe joint components such as the metallic sleeve and companion nut of a compression-type pipe coupling are entirely coated with a corrosion resistant polymeric plastic. On each of the sleeve and nut, the coating terminates in a thread formation of coating composition tandemly juxtaposed and comprising an extension of the metal thread thereon. When assembled in joint formation, the coatings on the individual components are interlocked by the engaged plastic threads as to enhance corrosion protection about the metal-to-metal threads of the fittings.

13 Claims, 3 Drawing Figures

CORROSION RESISTANT PIPE JOINT

BACKGROUND OF THE INVENTION

1. The field of art to which the invention pertains includes the art of pipe joints and pipe couplings, including liners and protectors therefor.

2. Threaded connections are widely used for effecting a leakproof joint with joined pipe sections whether it be a conduit joint, coupled joint or other form of fitting. Exemplifying couplings of the compression type for that purpose is the disclosure of U.S. Pat. No. 3,194,592 in which a nut is threaded onto a sleeve for effecting a gasket seal with a contained pipe end. A frequent application for compression couplings is in connection with buried underground piping for which it has been common practice to apply a chemically protective coating on the coupling components either before or after installation. Such coating practices have operated reasonably well where extreme care is exercised to insure against any void in the exposed surfaces including that of the engaged threads. Failure to observe adequate care can, however, expose any voided area to chemical attack and thereby defeat the purposes for which the coating had been applied. At the same time, post-installation coating, particularly in underground installations, can be most difficult if not impossible to effect with any degree of reliability. Yet, where the components, including the threads, have been pre-coated, there is always the risk that the coating if too thick will interfere with the threading action and if too thin will flake or otherwise be affected adversely by abrasion in the course of assembling the joint. With the advent of plastic coatings, various constructions have been proposed for enhancing the desired protection. Exemplifying the latter is the disclosure of U.S. Pat. No. 3,799,584 in which the assembled metal coupling is completely shrouded in a protective coating of polymeric plastic.

SUMMARY OF THE INVENTION

The invention relates to threaded pipe joints and more specifically to pipe couplings of the compression type afforded corrosion resistance by the use of plastic coatings. Not only does the construction hereof eliminate the aforesaid problems associated with the pre-installation or post-installation coating techniques currently practiced, but at the same time it is more reliable in effecting its end purpose than comparable plastic coatings currently available. This is achieved in accordance with the invention by terminating the coating on each of the interfitting components in a plastic thread formation located tandemly juxtaposed and comprising an extension of the metal thread thereon. With the plastic thread located behind the metal thread on the male component and ahead of the metal thread on the female component, a plastic-to-plastic thread engagement is obtained on assembly to interlock the respective coatings and per se effect a joint seal external to the main joint. In this manner the assembled joint is completely and reliably encapsulated with plastic and since the plastic threads are sequentially engaged automatically after engagement of the metal threads during installation takeup, the protective seal afforded thereby is relatively firm, lock tight and substantially foolproof.

It is therefore an object of the invention to provide a novel construction for enhancing corrosion protection afforded a threaded pipe joint.

It is a further object of the invention to provide a threaded joint in accordance with the previous object in which the coatings on the respective components of the joint are themselves readily interlocked on assembly into a plastic joint formation.

It is a further object of the invention to effect the last recited object with a compression type metal pipe coupling.

It is a still further object of the invention to effect the aforesaid objects with a relatively simple, minimal cost construction.

BRIEF DESCRIPTION OF THE DRAWINGS

Referring now to FIGS. 1 and 2 of the drawings, there is disclosed a preferred use of the invention in the form of a compression type pipe coupling generally designated 10 for joining pipe ends 12 and 14.

Figure 1:
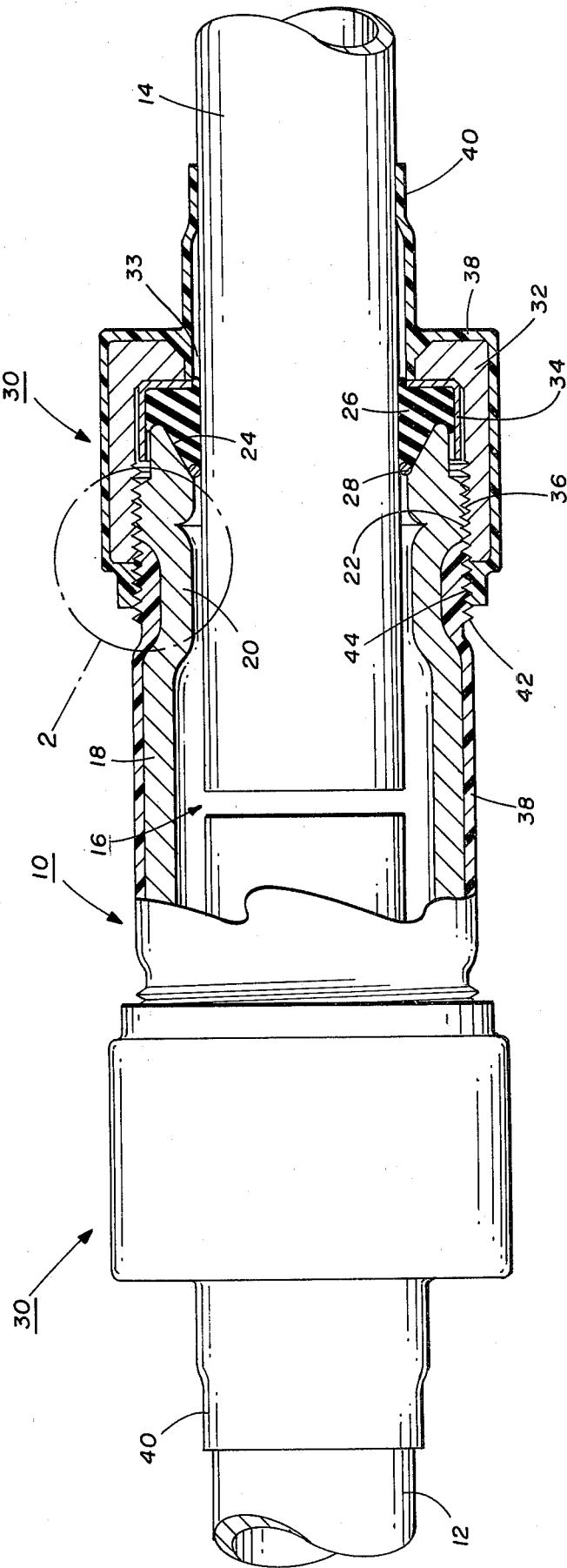
FIG. 1 is a plan view partially in section of a coated coupling construction in accordance herewith.

Comprising the coupling per se is an elongated tubular sleeve 16 of forged metal having a central body portion 18 merging with a neckdown portion 20 preceding peripheral male threads 22. The sleeve mouth terminates in a chamfer 24 to define a recess for receiving an annular resilient gasket 26 of composition compatible with the line content of piping on which the coupling is to be installed. Gasket 26 may, for example, comprise a type disclosed in U.S. Pat. No. 3,259,406 having an annular metal ring 28 effecting electrical contact between the pipe ends and sleeve thereat for purposes of cathodic protection.

Adapted to cooperate with the sleeve end for compressing gasket 26 into a pressure-tight seal within the cavity thereat is a hollow nut 30 having a conventional cup-shaped metal body 32 centrally bored at 33 to accomodate pipe end 14. The nut, in turn, supports a cup-like gasket retainer 34 and is internally threaded at 36 for threadable engagement with sleeve thread 22 in tightening and loosening the nut thereon.

Corrosion protection for both sleeve 16 and nut 30 is provided by means of a moisture impervious, resilient polymeric plastic layer 38 bonded to the metal substrate by coating or molding in a well known manner. Preferably, layer 38 comprises a coating of moisture impervious, chemical resistant, impact resistant, polymeric composition such as polyvinylchloride (PVC) but can likewise comprise such other compositions as nylon, polyethylene, polypropylene, polyurethane resins and the like. The coating is generally of uniform thickness about both the sleeve and nut and is continuous to cover at least the otherwise exposed periphery of each when assembled in joint formation. On nut 30, the coating terminates rearwardly in a tail-like sleeve 40 extending from inward of nut bore 33 at the radial wall of retainer 34 to envelop a short length of the received pipe end.

For effecting a plastic interlock between the assembled nut and sleeve in accordance herewith, coating 38 terminates on sleeve 16 in neckdown portion 20 at which the coating thickness is increased from about 0.040 inches to about 0.120 inches sufficient to provide structural support for the formation of plastic threads 42 thereabout. In this relation, it can be seen that plastic threads 42 are tandemly juxtaposed behind male metal thread 22 to essentially comprise an inward thread extension of the latter. At the same time, coating 38 on nut 30 terminates at a similarly increased thickness on the inward end of body 32 in being formed as plastic threads 44 tandemly juxtaposed to female metal thread 36 for comprising an outward thread extension thereof.

It can be readily understood that when nut 30 is initially mounted onto body 16, plastic nut thread 44 will first engage metal body thread 22. On continuing to tighten nut 30 inward onto body 16 for compressing gasket 26, thread 44 will in sequence eventually engage plastic body threads 42 and thereafter continue to be engaged concomitantly with the increased engagement between metal threads 22 and 36. When finally installed in completed joint formation, the coating interlock will be related in the manner illustrated with a plastic-to-plastic thread engagement between threads 42 and 44 and a metal-to-metal engagement between threads 22 and 36. In this arrangement, therefore, the respective coatings are themselves interlocked for enhancing protection throughout while the joint thereof per se effects a water seal external to the fitting of about 2 p.s.i. This result precludes penetration of corrosive elements while not otherwise interfering with the utility or assembly of the coupling in effecting joint formation. By virtue thereof, the intended in-service protection sought to be obtained by the coating is rendered substantially foolproof in avoiding any openings or gaps through which moisture or other corrosive elements could otherwise attack the vulnerable metal components of the coupling. Moreover, it should be appreciated that this result is obtainable despite the variables such as tolerances, pipe size variation, etc., normally encountered in a compression fitting.

Figure 2:
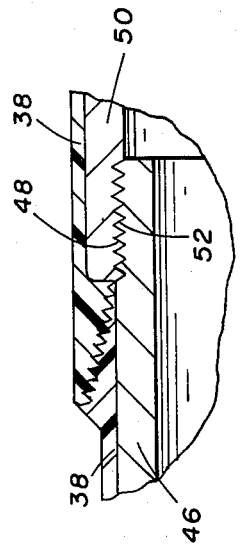
FIG. 2 is a fragmentary sectional view of a modified construction for the encircled portion of FIG. 1.

In FIG. 2 there is shown the same basic construction as previously described with a further modification in that plastic threads 42 and 44 are tapered at an angle $\alpha$ of up to about 20° where desired for increased sealing effect therebetween.

Figure 3:
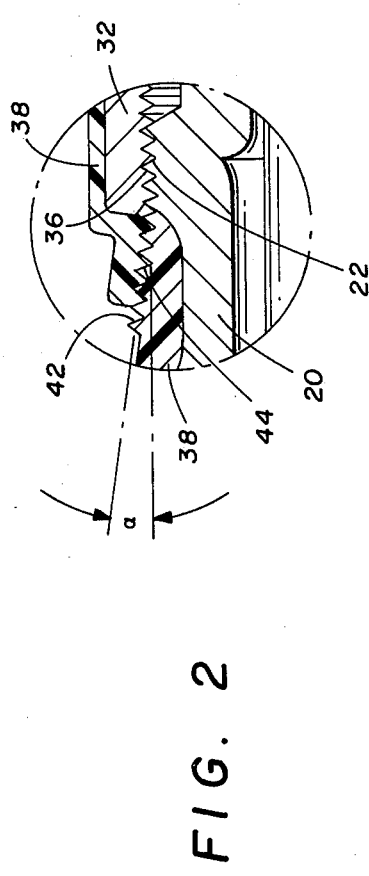
FIG. 3 is a fragmentary sectional view of the construction hereof as applied to a conduit joint.

FIG. 3 illustrates a construction for obtaining a similar result with a conduit joint rather than a coupling. For these purposes a pipe end 46 having a male thread 48 is to be joined with pipe end 50 having a female thread 52. A coating 38 is bonded about the periphery of each pipe end. The coating on pipe end 46 terminates behind thread 48 in a plastic thread formation 42 while the coating on pipe end 50 terminates ahead of thread 52 in a plastic thread formation 44. Threads 42 and 44 can be either straight or angled as previously described.

By the above description there is disclosed a novel coating construction for a pipe joint that is reliably effective yet relatively simple in principal to insure substantially foolproof installation assembly under even the most severest of field conditions. When installed in the conventional manner, the interfitting components such as nut 30 is threaded onto sleeve 16 until gasket pressure is adequate to maintain the intended seal against leakage of line content. In so doing, there is produced a thread tight interlocked relation between plastic threads 42 and 44 without need to test or otherwise ascertain the existence of required closure contact therebetween. Not only does the novel construction hereof achieve the foregoing results but the specific features by which those results are obtained represent a relatively inexpensive construction per se constributing toward the overall novelty thereof. It should be understood, of course, that the invention could be employed or adapted for a variety of threaded joints beyond the described embodiments.

Since many changes could be made in the above construction and many apparently widely different embodiments of this invention could be made without departing from the scope thereof, it is intended that all matter contained in the drawings and specification shall be interpreted as illustrative and not in a limiting sense.

The embodiments of the invention in which an exclusive property or privilege is claimed are defined as follows:

1. Corrosion protection for a threaded pipe joint comprising:
   a. a first polymeric plastic layer supported about the periphery of a first metal component of the joint; and
   b. a second polymeric plastic layer supported about the periphery of the other metal component of the joint;
   c. each of said plastic layers including a thread formation of plastic composition located tandemly juxtaposed to the metal threads of said components on which it is supported respectively to comprise a plastic thread extension of the metal threads thereon, said plastic threads being adapted when assembled in joint formation for effecting a plastic-to-plastic threaded interlock therebetween.

2. Corrosion protection according to claim 1 in which one of said plastic thread formations is located behind the male of said metal threads on one of said joint components and the other of said plastic thread formations is located forward of the female of said metal threads on the other of said joint components.

3. Corrosion protection according to claim 2 in which said plastic threads are tapered for effecting increased sealing therebetween.

4. Corrosion protection according to claim 2 in which the mean layer thickness of said plastic layer portion containing threads is at least twice the thickness of the layer adjacent thereto.

5. Corrosion protection according to claim 2 in which said joint components comprise the threaded ends of pipe conduit.

6. Corrosion protection according to claim 2 in which at least one of said joint components comprises a pipe fitting.

7. Corrosion protection according to claim 2 in which said joint components comprise the sleeve and nut of a compression type pipe coupling.

8. Corrosion protection according to claim 7 in which the male of said metal threads is contained on said sleeve and the female of said metal threads is contained on said nut.

9. Corrosion protection according to claim 8 in which said metal sleeve includes a male thread at each of its ends and there is included a metal nut for threaded engagement at each end of said sleeve.

10. Corrosion protection according to claim 8 in which at least one of said plastic layers comprises a coating.

11. In a compression type coupling for joining of pipe ends including a tubular metal sleeve having a thread on at least one end and a metal nut having a thread for cooperating with the thread on said sleeve in effecting an assembled joint, corrosion protection therefor comprising:

a. a first polymeric plastic layer supported about the periphery of said sleeve; and
b. a second polymeric plastic layer supported about the periphery of said nut;
c. each of said plastic layers including a thread formation of plastic composition located tandemly juxtaposed to the metal threads of said sleeve or nut on which it is supported respectively to comprise a plastic thread extension of the metal threads thereon, said plastic threads being adapted when assembled for effecting a plastic-to-plastic threaded interlock therebetween.

12. In a compression type coupling according to claim 11 in which one of said plastic thread formations is located behind the male of said metal threads on one of said sleeve or said nut and the other of said plastic thread formations is located forward of the female of said metal threads on the other of said sleeve or said nut.

13. In a compression type coupling according to claim 12 in which the male of said metal threads is contained on said sleeve and the female of said metal threads is contained on said nut.

* * * * *